United States Patent
Yodogawa et al.

(10) Patent No.: US 8,735,479 B2
(45) Date of Patent: May 27, 2014

(54) FLUORINATED ELASTIC COPOLYMER COMPOSITION AND ITS CROSS-LINKED RUBBER MEMBER

(75) Inventors: Masahide Yodogawa, Tokyo (JP); Masayuki Saito, Tokyo (JP); Mitsuru Seki, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 276 days.

(21) Appl. No.: 12/911,996

(22) Filed: Oct. 26, 2010

(65) Prior Publication Data

US 2011/0040005 A1    Feb. 17, 2011

Related U.S. Application Data

(63) Continuation of application No. PCT/JP2009/058942, filed on May 13, 2009.

(30) Foreign Application Priority Data

May 20, 2008 (JP) ................. 2008-131972

(51) Int. Cl.
*C08K 5/098* (2006.01)
*C08L 27/18* (2006.01)

(52) U.S. Cl.
USPC ........... 524/398; 524/394; 524/399; 524/400; 524/545

(58) Field of Classification Search
USPC ........... 524/394, 398, 399, 400, 545
See application file for complete search history.

(56) References Cited

U.S. PATENT DOCUMENTS

| | | | | |
|---|---|---|---|---|
| 4,543,394 A * | 9/1985 | Finlay et al. | ............ | 525/276 |
| 4,746,573 A * | 5/1988 | Arcella et al. | ............ | 428/407 |
| 5,334,667 A * | 8/1994 | Yamamoto et al. | ............ | 525/370 |
| 5,340,864 A * | 8/1994 | Tomihashi et al. | ............ | 524/297 |
| 5,891,941 A | 4/1999 | Tanaka et al. | | |
| 6,011,129 A * | 1/2000 | Saito et al. | ............ | 526/247 |
| 6,191,233 B1 * | 2/2001 | Kishine et al. | ............ | 525/326.3 |
| 6,794,455 B2 * | 9/2004 | Hung | ............ | 525/326.2 |
| 6,906,137 B2 * | 6/2005 | Oriani et al. | ............ | 525/165 |
| 2007/0276097 A1 | 11/2007 | Yodogawa et al. | | |
| 2010/0196709 A1 | 8/2010 | Yodogawa et al. | | |

FOREIGN PATENT DOCUMENTS

| | | |
|---|---|---|
| EP | 0 737 714 A1 | 10/1996 |
| GB | 2 244 488 A | 12/1991 |
| JP | 53-009848 | 1/1978 |
| JP | 2-27365 A | 1/1990 |
| JP | 07-196879 | 8/1995 |
| JP | 10-138267 | 5/1998 |
| JP | 2006-143977 | 6/2006 |
| JP | 2008186612 A * | 8/2008 |
| WO | 2006/006468 | 1/2006 |

OTHER PUBLICATIONS

Machine translation of JP 2008-186612, Aug. 14, 2008.*
International Search Report issued Aug. 11, 2009 in PCT/JP09/058942 filed May 13, 2009.
Extended European Search Report issued Feb. 23, 2011, in Patent Application No. 09750498.9.

* cited by examiner

*Primary Examiner* — Vickey Nerangis
(74) *Attorney, Agent, or Firm* — Oblon, Spivak, McClelland, Maier & Neustadt, L.L.P.

(57) ABSTRACT

To provide a fluorinated elastic copolymer composition, and a cross-linked rubber member obtained by crosslinking the fluorinated elastic copolymer composition, which is excellent in hot water resistance and steam resistance under severe conditions.

A fluorinated elastic copolymer composition, which comprises a fluorinated elastic copolymer and a compound represented by the following formula (1) wherein the compound represented by the following formula (1) is contained in an amount of from 0.1 to 10 parts by mass per 100 parts by mass of the fluorinated elastic copolymer:

$$(RCOO^-)_n M^{n+} \qquad (1)$$

(wherein R is a $C_{10-30}$ organic group, n is an integer of 2 or 3, and M is an alkaline earth metal, Zn, Cd, Co, Sn, Cu, Pb, Ni or Al).

14 Claims, No Drawings

FLUORINATED ELASTIC COPOLYMER COMPOSITION AND ITS CROSS-LINKED RUBBER MEMBER

TECHNICAL FIELD

The present invention relates to a fluorinated elastic copolymer composition which can be formed into a cross-linked rubber member which is excellent in hot water resistance and steam resistance, and a cross-linked rubber member which is excellent in hot water resistance and steam resistance.

BACKGROUND ART

Cross-linked rubber members obtained by crosslinking a fluorinated elastic copolymer are excellent in heat resistance, weather resistance, chemical resistance, water resistance and an insulating property and thereby have been widely used for various applications.

Particularly, a tetrafluoroethylene-propylene copolymer is excellent in base resistance and water resistance and used for applications of packings for alkali fluid, engine oil seals, steam resistance packings, packings for pipes for hot water, etc. (for example, Patent Document 1).

Recently, in facilities for producing foods or beverages, food safety is becoming more and more important, and it is strongly demanded to sterilize their production steps. Various sterilization methods such as sterilization with chemicals, sterilization with ozone water and sterilization with ultraviolet ray may be mentioned. Further, sterilization with hot water or steam has been widely used as an effective sterilization method. Further, cross-linked rubber members of fluorinated elastic copolymers have attracted attention as materials which have a durability against all of these sterilization methods.

Further, facilities for producing foods and beverages, facilities for producing pharmaceuticals, medical facilities and facilities for various microorganism tests, in which microorganisms are cultured, are sterilized with hot water or steam in order to avoid contamination of microorganisms.

Further, in industrial facilities, there are many facilities like power generation plants in which hot water or steam is used as a heat medium. Such facilities are more and more required to have the hot water resistance and the steam resistance.

Further, in household facilities, private electric generators or hot-water supply systems are being expanded, and rubber members which are excellent in the hot water resistance and the steam resistance and of which replacement frequency is low are demanded.

In general, as a method for molding a fluorinated elastic copolymer to obtain a cross-linked rubber member, the following method is known. That is, as a case requires, various additives such as a filler, a crosslinking agent and a crosslinking coagent are added, and kneading is carried out by twin rolls, a kneader or an extruder to obtain a fluorinated elastic copolymer composition, followed by molding the fluorinated elastic copolymer composition by e.g. extrusion molding or compression molding with a mold, and at the same time as the molding or after the molding, the fluorinated elastic copolymer composition is crosslinked by means of heating, applying an ionizing radiation or the like to obtain a cross-linked rubber member.

Heretofore, it has been known that when in the above step of kneading or molding, a processing aid such as a higher fatty acid, a metal salt of a higher fatty acid, an aliphatic amine, a natural wax or a polyethylene wax is added to a fluorinated elastic copolymer, such a step can be easily carried out (for example Patent Document 1 or 2). However, it has not been known that such a processing aid remarkably impairs properties, particularly the hot water resistance and the steam resistance, of cross-linked rubber members formed from a fluorinated elastic copolymer.

Particularly, in the above application, in a case where the temperature of hot water or steam to be used is at least 170° C., a cross-linked rubber member of a fluorinated elastic copolymer composition having sufficient heat resistance and steam resistance has not been known.

PRIOR ARTS

Patent Documents

Patent Document 1: JP-A-53-9848
Patent Document 2: JP-A-07-196879
Non-Patent Document 1: New Edition Basics of Rubber Techniques (edited by Japan Rubber Association) Second revision (published on November 30, H17 year) p. 166

DISCLOSURE OF THE INVENTION

Object to be Accomplished by the Invention

It is an object of the present invention to provide a fluorinated elastic copolymer composition to be formed into a cross-linked rubber member which is excellent in hot water resistance and steam resistance, and a cross-linked rubber member obtained by crosslinking the above fluorinated elastic copolymer composition, which is excellent in hot water resistance and steam resistance.

Means to Accomplish the Object

The present invention provides a fluorinated elastic copolymer and a cross-linked rubber member having the following features.

[1] A fluorinated elastic copolymer composition, which comprises a fluorinated elastic copolymer and a compound represented by the following formula (1) wherein the compound represented by the following formula (1) is contained in an amount of from 0.1 to 10 parts by mass per 100 parts by mass of the fluorinated elastic copolymer:

$$(RCOO^-)_n M^{n+} \quad (1)$$

(wherein R is a $C_{10-30}$ organic group, n is an integer of 2 or 3, and M is an alkaline earth metal, Zn, Cd, Co, Sn, Cu, Pb, Ni or Al).

[2] The fluorinated elastic copolymer composition according to the above [1], wherein R in the formula (1) is a $C_{10-25}$ linear saturated aliphatic hydrocarbon group.

[3] The fluorinated elastic copolymer composition according to the above [1] or [2], wherein M in the formula (1) is Mg, Ba, Ca, Zn or Al.

[4] The fluorinated elastic copolymer composition according to any one of the above [1] to [3], wherein the compound represented by the formula (1) is at least one selected from the group consisting of zinc stearate, calcium stearate, barium stearate, magnesium stearate and aluminum stearate.

[5] The fluorinated elastic copolymer composition according to any one of the above [1] to [4], which further contains an organic peroxide.

[6] The fluorinated elastic copolymer composition according to any one of the above [1] to [5], which further contains triallyl cyanurate, triallyl isocyanurate or trimethallyl isocyanurate.

[7] A cross-linked rubber member obtained by cross-linking the fluorinated elastic copolymer composition as defined in any one of the above [1] to [6] by an organic peroxide or an ionizing radiation.

[8] The cross-linked rubber member according to the above [7], which has a volume swell ratio of at most 10% in a hot water resistance test at 180° C. for 70 hours in accordance with JIS K6258.

[9] The cross-linked rubber member according to the above [7], which has a volume swell ratio of at most 10% in a steam resistance test at 170° C. for 70 hours in accordance with JIS K6258.

[10] A member for a hot water resistance apparatus, which is made of the cross-linked rubber member as defined in any one of the above [7] to [9].

[11] A member for a steam resistance apparatus, which is made of the cross-linked rubber member as defined in any one of the above [7] to [9].

Effects of the Invention

The fluorinated elastic copolymer composition of the present invention can be formed into a cross-linked rubber member which is excellent in hot water resistance and steam resistance even under severe conditions. Further, the cross-linked rubber member of the present invention is excellent in heat resistance, weather resistance, chemical resistance, insulating property and mechanical properties as well as in the hot water resistance and the steam resistance.

The cross-linked rubber member of the present invention can be preferably used as a construction member such as a sealing material which is used for sterilizing facilities for producing foods and beverages, facilities for producing pharmaceuticals, medical facilities or facilities for various microorganism tests by hot water or steam.

Further, the cross-linked rubber member of the present invention can be preferably used as a construction member such as a sealing material for industrial facilities, facilities for private electric generation, household facilities such as a hot-water supply system, in which hot water or steam is used as a heating medium. Further, the cross-linked rubber member of the present invention is excellent in durability in all of these sterilization methods. Particularly, in a case where the temperature of hot water or steam to be used is at least 150° C., more remarkably at least 170° C., the cross-linked rubber member of the present invention is remarkably effective as a sealing material.

MODE FOR CARRYING OUT THE INVENTION

The fluorinated elastic copolymer of the present invention is a copolymer comprising repeating units based on a fluoromonomer.

The fluoromonomer may, for example, be a fluoroolefin such as tetrafluoroethylene, vinylidene fluoride, hexafluoropropylene, chlorotrifluoroethylene or vinyl fluoride; a perfluoro(alkyl vinyl ether) such as a perfluoro(methyl vinyl ether) or a perfluoro(propyl vinyl ether); or a (perfluoroalkyl) ethylene such as trifluoromethyl ethylene or pentafluoroethylene.

The fluorinated elastic copolymer of the present invention may contain repeating units based on a hydrocarbon monomer containing no fluorine. The hydrocarbon monomer containing no fluorine may, for example, be an olefin such as ethylene, propylene, butene or isobutene; a vinyl ether such as methyl vinyl ether or ethyl vinyl ether; or a vinyl ester such as vinyl acetate.

Specifically, the fluorinated elastic copolymer may, for example, be a tetrafluoroethylene-propylene copolymer, a tetrafluoroethylene-propylene-vinylidene fluoride copolymer, a tetrafluoroethylene-propylene-perfluoroalkyl ethylene copolymer, an ethylene-tetrafluoroethylene-perfluoro(alkyl vinyl ether) copolymer, a vinylidene fluoride-hexafluoropropylene copolymer, a vinylidene fluoride-hexafluoropropylene-tetrafluoroethylene copolymer, a vinylidene fluoride-perfluoro(alkyl vinyl ether) copolymer, a vinylidene fluoride-perfluoro(alkyl vinyl ether)-tetrafluoroethylene copolymer or a tetrafluoroethylene-perfluoro(alkyl vinyl ether) copolymer.

Among them, the tetrafluoroethylene-propylene copolymer is preferred from the viewpoint of the hot water resistance and the steam resistance. The molar ratio of repeating units based tetrafluoroethylene/repeating units based on propylene in the tetrafluoroethylene-propylene copolymer, is preferably from 90/10 to 10/90, more preferably from 70/30 to 30/70, most preferably from 70/30 to 50/50.

The fluorinated elastic copolymer of the present invention may contain repeating units based on a monomer having various cross-linkable functional groups. When the fluorinated elastic copolymer has repeating units based on the monomer having a cross-linkable functional group, the crosslinking reactivity can be increased by heating the fluorinated elastic copolymer or the like.

The monomer having a cross-linkable functional group may, for example, be a monomer containing an iodine atom or a bromine atom; a vinyl ester such as vinyl acrylate, vinyl methacrylate, vinyl crotonate, vinyl chloroacetate or vinyl bromoacetate; or a vinyl ether such as vinyl glycidyl ether, allyl glycidyl ether, hydroxyethyl vinyl ether, hydroxybutyl butyl vinyl ether or chloroethyl vinyl ether.

The content of repeating units based on the monomer having a cross-linkable functional group is preferably from 0.1 to 20 mol %, more preferably from 0.1 to 10 mol % in the fluorinated elastic copolymer. The fluorinated elastic copolymer may be a polymer having an iodine atom or a bromine atom at the terminal.

The Mooney viscosity $ML_{1+4}$ (100° C.) of the fluorinated elastic copolymer used in the present invention is not particularly restricted, however, it is preferably from 20 to 180, more preferably from 30 to 150. The Mooney viscosity is an index for various average molecular weights. A high Mooney viscosity indicates that the molecular weight is high, and a low Mooney viscosity indicates that the molecular weight is low. When the Mooney viscosity is within the above range, the molding property is excellent, such being preferable.

The fluorinated elastic copolymer composition of the present invention contains a compound represented by the following formula (1):

$$(RCOO^-)_n M^{n+} \tag{1}$$

(wherein R is a $C_{10-30}$ organic group, n is an integer of 2 or 3, and M is an alkaline earth metal, Zn, Cd, Co, Sn, Cu, Pb, Ni or Al).

R in the compound represented by the formula (1) is a $C_{10-30}$ organic group. The number of carbon atoms in the organic group is preferably from 10 to 25, more preferably from 10 to 20, most preferably from 12 to 18.

The organic group in the formula (1) may be saturated or unsaturated, and it is preferably an aliphatic hydrocarbon group, more preferably a linear chain aliphatic hydrocarbon group, most preferably a saturated linear chain aliphatic hydrocarbon group. The compound represented by the formula (1) is generally known as a compound of a metal salt of a higher fatty acid.

The compound represented by the formula (1) may be a natural component such as an animal fatty acid or an artificially synthesized component. Further, it may be a mixture containing two or more fatty acids.

M in the formula (1) is an alkaline earth metal, Zn, Cd, Co, Sn, Cu, Pb, Ni or Al, preferably the alkaline earth metal, Zn, Pb or Al, more preferably Mg, Ba, Ca, Zn or Al, further preferably Ca or Al, most preferably Ca.

Specifically, the compound represented by the formula (1) may, for example, be calcium stearate, zinc stearate, barium stearate, magnesium stearate, aluminum stearate, cadmium stearate, cobalt stearate, tin stearate, lead stearate, copper stearate, nickel stearate, lithium stearate, calcium ricinoleate, zinc palmitate or aluminum myristate. One or more of these compounds may be incorporated in the fluorinated elastic copolymer.

Among the above compounds represented by the formula (1), calcium stearate, zinc stearate, barium stearate, magnesium stearate and aluminum stearate are preferred, and calcium stearate and aluminum stearate are more preferred. Further, calcium stearate is most preferred.

The content of the compound represented by the formula (1) is from 0.1 to 10 parts by mass per 100 parts by mass of the fluorinated elastic copolymer. The above content is optionally controlled within the above range, depending on the component of the fluorinated elastic copolymer composition containing a filler or an additive for obtaining the desired cross-linked rubber member. The content is preferably from 0.2 to 5 parts by mass, more preferably from 0.2 to 3 parts by mass, most preferably from 0.3 to 2 parts by mass. If the content is too low, molding processability deteriorates, and if the content is too high, the heat resistance of a cross-linked rubber member to be obtained may deteriorate. When the content is within the above range, molding processability is excellent, and the hot water resistance and the steam resistance of the cross-linked rubber member are remarkably excellent.

The fluorinated elastic copolymer composition of the present invention can be cross-linked by a usual cross-linking method and formed into a cross-linked rubber member. The cross-linking method is particularly preferably crosslinking by an organic peroxide or crosslinking by an ionizing radiation from the viewpoint of the hot water resistance and the steam resistance of a cross-linked rubber member to be obtained. In such a cross-linking method, a chemical bond by the crosslinking is a covalent bond which is free from charge separation or of which charge separation is little, and the cross-linked rubber member to be obtained is excellent in the hot water resistance and the steam resistance.

As the organic peroxide used for crosslinking, an organic peroxide is usually used. Specifically, the organic peroxide may, for example, be benzyl peroxide, dicumyl peroxide, di-tert-butyl peroxide, 2,5-dimethyl-2,5-bis(tert-butylperoxy)hexane, 2,5-dimethyl-2,5-bis(t-butylperoxy)hexyne-3, α,α'-bis(tert-butylperoxy)-p-diisopropylenebenzene or 1,1-bis(tert-butylperoxy)-3,3,5-trimethylcyclohexane.

The content of the organic peroxide is preferably from 0.3 to 10 parts by mass per 100 parts by mass of the fluorinated elastic copolymer. If the content is less than 0.3 part by mass, the crosslinking may sometimes be insufficient. If the content is higher than 10 parts by mass, the elasticity of a cross-linked rubber member may be impaired. The content of the organic peroxide is more preferably from 0.5 to 3 parts by mass.

In the crosslinking by an ionizing radiation, a crosslinking agent may be incorporated in the fluorinated elastic copolymer composition. Further, the crosslinking agent may not be incorporated. Radiation to be applied may, for example, be electron beam, γ-rays or ultraviolet ray. The amount of radiation for the ionizing radiation is preferably from 1 to 2,000 kGy, more preferably from 10 to 200 kGy.

The crosslinking agent for crosslinking by the ionizing radiation may, for example, be dicumyl peroxide, 2,5-dimethyl-2,5-bis(tert-butylperoxy)hexane or α-α'-bis(tert-butylperoxy)-p-diisopropylbenzene, and preferably dicumyl peroxide or α-α'-bis(tert-butylperoxy)-p-diisopropylbenzene.

The content of the crosslinking agent is preferably from 0.3 to 10 parts by mass, more preferably from 0.5 to 3 parts by mass, per 100 parts by mass of the fluorinated elastic copolymer.

In the case of crosslinking by an organic peroxide or ionizing radiation, an unsaturated polyfunctional compound is preferably incorporated in the fluorinated elastic copolymer composition as a crosslinking coagent. The crosslinking coagent may, for example, be triallyl cyanurate, triallyl isocyanurate, triallyl isocyanurate prepolymer, trimethallyl isocyanurate, 1,3,5-triacryloylhexahydro-1,3,5-triazine, triallyl trimellitate, m-phenylene diamine bismaleimide, p-quinone dioxime, p,p'-dibenzoyl quinone dioxime, dipropargyl terephthalate, diallyl phthalate, N,N',N'',N'''-tetraallyl terephthalamide, polymethyl vinyl siloxane or a vinyl group-containing siloxane oligomer such as polymethyl phenyl vinyl siloxane. Particularly, triallyl cyanurate, triallyl isocyanurate and trimethallyl isocyanurate are preferred, and triallyl isocyanurate is more preferred.

The content of the crosslinking coagent is preferably from 0.1 to 10 parts by mass, more preferably from 0.5 to 7 parts by mass, most preferably from 1 to 5 parts by mass, per 100 parts by mass of the fluorinated elastic copolymer.

As a case requires, various additives which are conventionally used for producing cross-linked rubber members may be added in the fluorinated elastic copolymer composition of the present invention.

Specifically, the additive may, for example, be a filler such as carbon black, silica, clay, talc or glass fibers, a pigment such as titanium oxide or bengala, a resin other than fluorinated elastic copolymers or a rubber.

The fluorinated elastic copolymer of the present invention can be easily produced by uniformly mixing the above respective components by a mixing apparatus for rubber such as a roll, a kneader, a Banbury mixer or an extruder.

The fluorinated elastic copolymer composition of the present invention can be molded by a normal method for molding rubber. The molding method may, for example, be compression molding, injection molding, extrusion, calendaring, or dipping or coating as dissolved in a solvent.

The fluorinated elastic copolymer composition of the present invention is crosslinked to form a cross-linked rubber member at the same time as molding or after molding.

In the case of crosslinking by an organic peroxide, taking the molding method or the shape of a cross-linked rubber member into consideration, hot press crosslinking, steam crosslinking, hot air crosslinking or lead encasing crosslinking may be employed. As conditions for crosslinking, usually a range of from 100 to 400° C. for from several seconds to 24 hours is preferred. 140 to 250° C. for one minute to one hour is more preferred. Further, secondary crosslinking is preferably employed for the purpose of improving mechanical properties and the compression set of a crosslinked product and stabilizing other properties. As conditions for the secondary crosslinking, a temperature of from 100 to 300° C. for from about 30 minutes to about 48 hours is preferred, and 140 to 250° C. for from one hour to 24 hours is more preferred.

Further, in the case of crosslinking by an ionizing radiation, the temperature at the time of crosslinking is not restricted. As a case requires, a cross-linked rubber member obtained by crosslinking by an organic peroxide is irradiated with an ionizing radiation to increase crosslink density.

In a hot water resistance test at 180° C. for 70 hours in accordance with JIS K6258 and in a steam resistance test at 170° C. for 70 hours in accordance with JIS K6258, the cross-linked rubber member of the present invention preferably has a volume swell ratio of at most 10%, more preferably at most 8%, further preferably at most 5%, most preferably at most 3%.

The cross-linked rubber member of the present invention is useful as an O ring, a seal, a packing, a gasket, a bulb, a tube, a hose, a roll, a sheet, a connector, etc. for installations for producing food in which steam sterilization or hot water sterilization is carried out.

Further, the cross-sectioned shape of the ring, the seal or the packing produced by using the cross-linked rubber member of the present invention may be various. Specifically, it may, for example, be a square, an O-shape or ferrule shape or an asymmetric shape such as a D-shape, L-shape, T-shape, V-shape, X-shape or Y-shape.

EXAMPLES

Now, the present invention will be described in further detail with reference to Examples, but it should be understood that the present invention is by no means restricted thereto.

The hot water resistance test and the steam resistance test in Examples and Comparative Examples were carried out by the following methods.

In Tables 1 to 4, the contents of respective components used are shown by parts by mass.

[Hot Water Resistance Test]

The hot water resistance was measured in accordance with JIS K6258. In the hot water resistance test of the cross-linked rubber member, a cross-linked rubber member was put in a closed container together with a predetermined amount of water sufficient for immersion, heated at 180° C. for 70 hours and then cooled to room temperature. Then, the cross-linked rubber member was taken out from the closed container and within 30 minutes, the change of properties of the cross-linked rubber member was measured.

[Steam Resistance Test]

The steam resistance was measured in accordance with JIS K6258. In the steam resistance test of the cross-linked rubber member, a cross-linked rubber member was put in a closed type steam generation apparatus together with a predetermined amount of water sufficient for generating steam and left under steam conditions at 170° C. for 70 hours and cooled to room temperature. Then, the cross-linked rubber member was taken out from the closed container, and within 30 minutes, the change of physical properties of the cross-linked rubber member was measured.

Examples 1 to 4

In accordance with components and blend amounts shown in Table 1, respective components were uniformly mixed with a fluorinated elastic copolymer-1 and a fluorinated elastic copolymer-2 by a twin rolls-mill to produce a fluorinated elastic copolymer composition. The obtained fluorinated elastic copolymer composition was press-crosslinked at 170° C. for 20 minutes. Then, secondary crosslinking was carried out in an oven at 180° C. for 4 hours to obtain a cross-linked rubber member. The ordinary state physical properties of the obtained cross-linked rubber member were measured, and the hot water resistance test was carried out. Table 1 shows results.

Comparative Examples 1 to 3

A fluorinated elastic copolymer composition was produced in the same manner as in Example 1 and in accordance with components and blend amounts shown in Table 2, and the fluorinated elastic copolymer composition was crosslinked to obtain a cross-linked rubber member. The ordinary state physical properties of the obtained cross-linked rubber member were measured, and the hot water resistance test was carried out. Table 2 shows results.

Examples 6 to 9

In accordance with components and blend amounts shown in Table 3, respective components were uniformly mixed with a fluorinated elastic copolymer-1 by a twin rolls-mill to produce a fluorinated elastic copolymer composition. The obtained elastic copolymer composition was press-crosslinked at 170° C. for 20 minutes. Then, secondary crosslinking was carried out in an oven at 180° C. for 4 hours to obtain a cross-linked rubber member. The ordinary state physical properties of the obtained cross-linked rubber member were measured, and the steam resistance test was carried out. Table 3 shows results.

Comparative Examples 4 to 5

A fluorinated elastic copolymer composition was produced in the same manner as in Example 6 and in accordance with components and blend amounts shown in Table 4, and the fluorinated elastic copolymer composition was crosslinked to obtain a cross-linked rubber member. The ordinary state physical properties of the obtained cross-linked rubber member were measured, and the steam resistance test was carried out. Table 4 shows results.

Example 10

A fluorinated elastic copolymer composition comprising 100 parts by mass of a fluorinated elastic copolymer-1, 1 part by mass of calcium stearate, 30 parts by mass of MT carbon and 5 parts by mass of TAIC was irradiated with 100 kGy of electron beam and crosslinked to obtain an appropriately cross-linked rubber member. The ordinary state physical properties and result of the steam resistance test of the obtained cross-linked rubber member are shown in Table 3.

Further, symbols described in Tables 1 to 4 are as follows.

Fluorinated elastic copolymer-1: AFLAS 150P (tetrafluoroethylene-propylene copolymer, Mooney viscosity $ML_{1+4}$ (100° C.): 95, manufactured by Asahi Glass Company, Limited)

Fluorinated elastic copolymer-2: DAI-EL G-902 (vinylidene fluoride-hexafluoropropylene-tetrafluoroethylene copolymer, Mooney viscosity $ML_{1+4}$ (100° C.): 50, manufactured by DAIKIN INDUSTRIES, ltd.)

TAIC: triallyl isocyanurate (manufactured by Nippon Kasei Chemical Co., Ltd.)

Perkadox 14: α,α'-bis(tert-butylperoxy)-p-diisopropylbenzene (manufactured by Kayaku Akzo Corporation)

Perhexa 25B: 2,5-dimethyl-2,5-bis(tert-butylperoxy)hexane (manufactured by NOF CORPORATION)

TABLE 1

|  | Ex. 1 | Ex. 2 | Ex. 3 | Ex. 4 | Ex. 5 |
|---|---|---|---|---|---|
| Fluorinated elastic copolymer-1 | 100 | 100 | 100 | 100 |  |
| Fluorinated elastic copolymer-2 |  |  |  |  | 100 |
| Calcium stearate | 1 |  |  |  | 1 |
| Zinc stearate |  | 1 |  |  |  |
| Barium stearate |  |  | 1 |  |  |
| Aluminum stearate |  |  |  | 1 |  |
| MT carbon | 30 | 30 | 30 | 30 | 20 |
| TAIC | 5 | 5 | 5 | 5 | 4 |
| Perkadox 14 | 1 | 1 | 1 | 1 |  |
| Perhexa 25B |  |  |  |  | 2.5 |
| Ordinary state physical properties of cross-linked rubber member |  |  |  |  |  |
| Hardness (degree, JIS-A) | 72 | 71 | 71 | 70 | 71 |
| Tensile strength (MPa) | 15.6 | 14.6 | 15.6 | 14.1 | 20.8 |
| Elongation (%) | 313 | 286 | 311 | 325 | 329 |
| Change of physical properties after the hot water resistance test |  |  |  |  |  |
| Change of hardness (degree, JIS-A) | −2 | −1 | −2 | ±0 | −5 |
| Change of tensile strength (%) | −4 | −13 | −12 | −16 | −23 |
| Change of elongation (%) | +7 | +21 | +3 | +20 | +9 |
| Volume swell ratio (%) | +1.6 | +2.0 | +2.4 | +0.4 | +5.0 |

TABLE 2

|  | Comp. Ex. 1 | Comp. Ex. 2 | Comp. Ex. 3 |
|---|---|---|---|
| Fluorinated elastic copolymer-1 | 100 | 100 |  |
| Fluorinated elastic copolymer-2 |  |  | 100 |
| Sodium stearate | 1 |  | 1 |
| Potassium stearate |  | 1 |  |
| MT carbon | 30 | 30 | 20 |
| TAIC | 5 | 5 | 4 |
| Perkadox 14 | 1 | 1 |  |
| Perhexa 25B |  |  | 2.5 |
| Ordinary state physical properties of cross-linked rubber member |  |  |  |
| Hardness (degree, JIS-A) | 72 | 70 | 71 |
| Tensile strength (MPa) | 15.2 | 15.1 | 20.0 |
| Elongation (%) | 273 | 291 | 324 |
| Change of physical properties after the steam resistance test |  |  |  |
| Change of hardness (degree, JIS-A) | −4 | −3 | −6 |
| Change of tensile strength (%) | −6 | −1 | −23 |
| Change of elongation (%) | +9 | 1 | +8 |
| Volume swell ratio (%) | +13.9 | +14.2 | +11.1 |

TABLE 3

|  | Ex. 6 | Ex. 7 | Ex. 8 | Ex. 9 | Ex. 10 |
|---|---|---|---|---|---|
| Fluorinated elastic copolymer-1 | 100 | 100 | 100 | 100 | 100 |
| Calcium stearate | 1 |  |  |  | 1 |
| Zinc stearate |  | 1 |  |  |  |
| Barium stearate |  |  | 1 |  |  |
| Aluminum stearate |  |  |  | 1 |  |
| MT carbon | 30 | 30 | 30 | 30 | 30 |
| TAIC | 5 | 5 | 5 | 5 | 5 |
| Perkadox 14 | 1 | 1 | 1 | 1 |  |
| Ordinary state physical properties of cross-linked rubber member |  |  |  |  |  |
| Hardness (degree, JIS-A) | 72 | 71 | 71 | 70 | 71 |
| Tensile strength (MPa) | 15.6 | 14.6 | 15.6 | 14.1 | 16.0 |
| Elongation (%) | 313 | 286 | 311 | 325 | 276 |
| Change of physical properties after the hot water resistance test |  |  |  |  |  |
| Change of hardness (degree, JIS-A) | −2 | −1 | −1 | 0 | −1 |
| Change of tensile strength (%) | −7 | −10 | −5 | −4 | −3 |
| Change of elongation (%) | −1 | +24 | 0 | +6 | +2 |
| Volume swell ratio (%) | +1.3 | +2.8 | +2.2 | +0.1 | +1.9 |

TABLE 4

|  | Comp. Ex. 4 | Comp. Ex. 5 |
|---|---|---|
| Fluorinated elastic copolymer-1 | 100 | 100 |
| Sodium stearate | 1 |  |
| Potassium stearate |  | 1 |
| MT carbon | 30 | 30 |
| TAIC | 5 | 5 |
| Perkadox 14 | 1 | 1 |
| Ordinary state physical properties of cross-linked rubber member |  |  |
| Hardness (degree, JIS-A) | 72 | 70 |
| Tensile strength (MPa) | 15.2 | 15.1 |
| Elongation (%) | 273 | 291 |
| Change of physical properties after the steam resistance test |  |  |
| Change of hardness (degree, JIS-A) | −4 | −2 |
| Change of tensile strength (%) | −3 | +3 |
| Change of elongation (%) | +17 | −8 |
| Volume swell ratio (%) | +11.9 | +11.9 |

Example 11

A packing is produced by using a fluorinated elastic copolymer composition having components shown in Example 1. When the packing is used in steps for producing food, it showed excellent durability against steam (170° C.) used for sterilization in the steps.

INDUSTRIAL APPLICABILITY

A cross-linked rubber member obtained from the fluorinated elastic copolymer composition of the present invention is useful as an O ring, a seal, a packing, a gasket, a bulb, a tube, a hose, a roll, a sheet, a connector, etc. in facilities for producing food in which steam sterilization or hot water sterilization is carried out. Further, the cross-linked rubber member is useful as a member for culturing microorganisms, which is sterilized by using steam or hot water, industrial facility members and household facility members provided with a pipe for steam or hot water, members for power generation in which hot water or steam is used as a heat medium, construction members such as seal material, which is contacted to hot water or steam, etc.

The entire disclosure of Japanese Patent Application No. 2008-131972 filed on May 20, 2008 including specification, claims and summary is incorporated herein by reference in its entirety.

What is claimed is:

1. A fluorinated elastic copolymer composition, comprising:
a tetrafluoroethylene-propylene elastic copolymer; and
a compound of formula (1):

$(RCOO^-)_n M^{n+}$ (1)

wherein R is a $C_{10-30}$ organic group, n is an integer of 2 or 3, and M is an alkaline earth metal, Zn, Cd, Co, Sn, Cu, Pb, Ni or Al, and
an organic peroxide, and
an amount of the compound of formula (1) is from 0.1 to 10 parts by mass per 100 parts by mass of the tetrafluoroethylene-propylene elastic copolymer and
wherein a volume swell ratio in a steam resistance test at 170° C. for 70 hours according to JIS K6258 of a member obtained by press-crosslinking the fluorinated elastic copolymer composition with triallyl isocyanurate is less than 3%.

2. The fluorinated elastic copolymer composition according to claim 1, wherein R is a $C_{10-25}$ linear saturated aliphatic hydrocarbon group.

3. The fluorinated elastic copolymer composition according to claim 1, wherein M is Mg, Ba, Ca, Zn or Al.

4. The fluorinated elastic copolymer composition according to claim 1, wherein the compound of formula (1) is at least one selected from the group consisting of zinc stearate, calcium stearate, barium stearate, magnesium stearate and aluminum stearate.

5. The fluorinated elastic copolymer composition according to claim 1, wherein the organic peroxide is at least one selected from the group consisting of benzyl peroxide, dicumyl peroxide, di-tert-butyl peroxide, 2,5-dimethyl-2,5-bis(tert-butylperoxy)hexane, 2,5-dimethyl-2,5-bis(t-butylperoxy)hexyne-3,α,α'-bis(tert-butylperoxy)-p-diisopropylenebenzene and 1,1-bis(tert-butylperoxy)-3,3,5-trimethylcyclohexane.

6. The fluorinated elastic copolymer composition according to claim 1, wherein a content of the organic peroxide is from 0.3 to 10 parts by mass per 100 parts by mass of the fluorinated elastic copolymer.

7. The fluorinated elastic copolymer composition according to claim 1, further comprising at least one cross-linking coagent selected from the group consisting of triallyl cyanurate, triallyl isocyanurate and trimethallyl isocyanurate.

8. The fluorinated elastic copolymer composition according to claim 7, wherein a content of the cross-linking coagent is from 0.1 to 10 parts by mass, per 100 parts by mass of the fluorinated elastic copolymer.

9. The fluorinated elastic copolymer composition according to claim 1, wherein a Mooney viscosity $[ML_{1+4}(100°\,C.)]$ of the fluorinated elastic copolymer is from 20 to 180.

10. A cross-linked rubber member obtained by cross-linking the fluorinated elastic copolymer composition as defined in claim 1 by an organic peroxide or an ionizing radiation.

11. The cross-linked rubber member according to claim 10, wherein a volume swell ratio of the member is at most 5% in a hot water resistance test at 180° C. for 70 hours in accordance with JIS K6258.

12. The cross-linked rubber member according to claim 10, wherein a volume swell ratio of the member is at most 10% in a steam resistance test at 170° C. for 70 hours in accordance with JIS K6258.

13. A hot water resistant apparatus, comprising the cross-linked rubber member as defined in claim 10.

14. A steam resistant apparatus, comprising the cross-linked rubber member as defined in claim 10.

* * * * *